May 29, 1956 J. D. E. KREUTTNER 2,747,795
MEASURING AND CALCULATING DEVICE
Filed Oct. 15, 1952
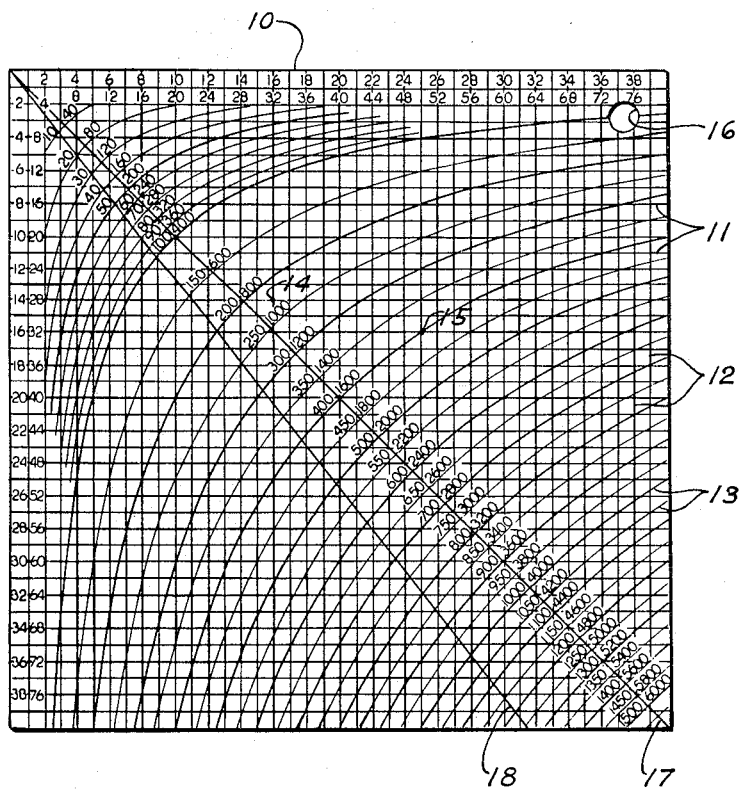
JOHN D. KREUTTNER
INVENTOR.
BY Darby + Darby
ATTORNEYS

United States Patent Office 2,747,795
Patented May 29, 1956

2,747,795

MEASURING AND CALCULATING DEVICE

John D. E. Kreuttner, New York, N. Y.

Application October 15, 1952, Serial No. 314,889

4 Claims. (Cl. 235—61)

The present application is a continuation-in-part of my prior copending application Serial No. 278,072 filed March 22, 1952, now abandoned.

The present invention relates to measuring and calculating devices and particularly to a device intended to be utilized in directly reading the area included within linear dimensions of plans drawn to scale.

In many situations it is very important to provide simple and rapid means for determining from scale drawings or plans, the areas or volumes of various portions of such drawings or plans. For example, in heating and ventilating design, it is necessary to determine the areas or volumes of rooms of a building, from the plans therefor. There are many other fields it is similarly important to be able to read areas or volumes directly from plans, such as in estimating materials, building design, for determining or designing occupancy ratios, window-floor ratio, shaft areas, tenant allocations and alterations, light distribution, floor loads, wind stress, drainage, measuring for roofing, floor covering, paving, excavation and fill, shelving or fixturing, storage and inventory, and many others.

The present invention provides a simple device having no moving parts, with which rectangular or circular plan areas can be read directly, and rectangular or cylindrical volumes directly determined. As an auxiliary feature, the present device provides a simple means, without moving parts, for performing a variety of mathematical operations, such as multiplication, division, squaring, square root, areas of circles, etc.

More particularly still the device comprises a card, preferably of transparent material, designed to be laid upon a scale plan having rectangular or circular areas to be calculated so that the linear dimensions are laid off on the scale and the area may be directly determined by locating points on curves of the card. The invention thus has for its principal object to produce a simple device which is readily utilized to determine the area of rectangles or circles of varying sizes by direct reading from a scale plan including those areas, and to perform other mathematical operations.

It is another object of the invention to provide such a device which has no mechanical moving parts and the use of which is extremely simple, the device itself being likewise very simple and economically and readily manufactured.

Other objects and features of the invention will be apparent when the following description is considered in connection with the annexed drawing, in which, the single figure is a plan view of a device in accordance with my invention, the particular device being intended for use with plans and the like drawn to a scale of either ⅛ inch to the foot or ¹⁄₁₆ inch to the foot, although not limited thereto.

In its preferred form, my invention comprises a rectangular sheet of material 10, preferably of transparent material such as celluloid or transparent plastic, having vertical lines 12 and horizontal lines 11 ruled thereon, these lines being equally spaced to form a usual type of rectangular coordinate grid. On the left margin, the horizontal lines 11 are designated by suitable figures depending upon the scale for which the particular device is designed to be utilized, there being, in the particular instance shown in the drawing, two sets of figures along the left margin, the far left hand set corresponding to a scale of ⅛ inch to the foot and the set adjacent to the right corresponding to a scale of ¹⁄₁₆ inch to the foot. Along the upper margin of the sheet 10 a like pair of scales is printed. The uppermost scale corresponds with the ⅛ inch to the foot scale and the one below corresponds to a scale of ¹⁄₁₆ inch to the foot. The upper left hand corner is the common zero of all sets of figures.

Extending generally in a direction from the lower edge of the sheet 10 to the right hand edge is a group of curves designated 13, which curves are curves of equal area; that is, for any one curve 13, the area of all rectangles having a diagonal between the zero coordinate point and any point of the curve, is the same. These rectangles, of course, are formed by the top and left edges of the device, and the lines parallel thereto passing through the particular point of the particular curve 13. If the lengths of the sides of these rectangles are taken to be the numbers appearing at the left and top rows of figures, then each curve is so arranged and labelled that for any point on it the area of the rectangle formed by the top and left edges of the device and the lines passing through the particular point of the curve and parallel to the top and left edges of the device, will be numerically equal to the number by which the curve is labelled. Each curve is therefore in effect the locus of the lower right hand corners of equal area rectangles whose left and top sides are coincident with the edges of the device and are equal in length to the distances from each particular point of the curve to the left and top edges of the device as measured on the scale used on the device. Each curve 13 is numerically designated with figures representing the area indicated by that curve when either of the two scales is considered, that is, each curve carries two figures, the left set representing areas in a plan drawn to the scale of ⅛ inch to the foot and the right set representing the areas of a plan drawn to a scale of ¹⁄₁₆ inch to the foot.

In utilizing the device to measure rectangular areas, the upper left hand corner thereof is placed on a plan in a position coinciding with the upper left hand corner of a rectangular outline whose area of which is desired. The horizontal upper edge of the device is of course made to coincide with the like edge of the outline to be measured, and the left-hand edge is made to coincide with the left-hand edge of that outline. The lower right hand corner of the outline to be measured will obviously lie either upon one of the family of curves 13 or adjacent one of those curves. In the event that this corner lies directly upon a curve 13, the area of the outline can be directly read from that curve as the number labelling the curve, whereas if the lower corner of the outline to be measured lies between two curves, the area of the outline can be readily determined by interpolation.

In a preferred form of my invention, the scale figures corresponding to one of the two scales, for example, the ⅛ inch to the foot scale, are in one color and those corresponding to the second scale are in another color so that they can be readily distinguished and likewise each curve bears two figures, each of which is in one of the two colors corresponding respectively to the two scales, so that there is no confusion in reading the area of a particular figure.

As an example of the use of the device, let us assume that a particular plan is drawn to the scale of ⅛ inch to the foot, the device is placed upon a rectangular outline, the area of which is to be determined, with its upper left hand corner coincident with the upper left hand corner of the outline and with its upper and left hand margins coinciding with the like margins of the particular outline. Let us assume that the particular figure represents a room having a dimension of 14' x 16'; then the lower right hand corner of the outline will fall at a point 14 midway between the two curves representing 200 and 250 square feet and the area therefore is approximately 225 square feet (accurately 224 square feet).

As another example, let us assume that a plan drawn to a scale of 1/16 inch to the foot is utilized and that with the card 10 in place the lower right hand corner of the particular area being measured coincides with a point marked 15 in the drawing. It is then obvious that the area measured is 32' x 50' and that this area is 1600 square feet.

It will be obvious that this device permits direct reading of areas without requiring the reading of the linear dimensions, so long as the scale of the plan being measured is known. However, as a by-product of the area measurement, the lengths of the sides are directly read from the vertical and horizontal figures on the device 10.

The device is provided with a hole 16 for convenience in storage since by such provision the device may be hung in a convenient place when not in use.

It will be obvious that a greater number of scales may be utilized on the same card and further that the particular scales utilized may be any desired or common in a particular art. For example, the coordinates may be laid out on an engineer's scale of decimal portions of 1 inch to the foot or an architect's scale of multiples of 1/16 inch to the foot.

If the particular areas to be measured are straight sided and of other than rectangular shape, their areas can nonetheless be calculated by my device by dividing the figure into smaller figures of rectangular configuration and adding the measured and calculated areas of these smaller figures.

It will also be understood that the device may be utilized in connection with the measurement of areas of rectangles on plans having scales different from those represented on the device. For example, if a plan has a scale of 1/32 inch per foot, then the present device may be used directly by relying upon the 1/16 scale and multiplying the resulting figure by 4. Correspondingly, for a scale of 1/4 inch to the foot, the 1/8 scale of the device can be utilized by dividing the indicated area by 4. In addition, it will be understood that the figures on the device can be used as inches, instead of feet, which would be of obvious advantage in packaging and small product design work.

The device may also be used as a general multiplication or division computer. To multiply any two numbers, one merely notes respective horizontal and vertical lines labelled on the edge scales with the numbers being multiplied. The intersection of those vertical and horizontal lines determines a curve 13 whose labelled number is the desired product. For uneven multipliers or product, interpolation is used.

Division is accomplished by a reverse process. The curve 13 labelled by the dividend number is selected, as is the vertical line labelled by the divisor number, thereby determining their point of intersections. The number labelling the horizontal line passing through that point is the quotient. Of course, the horizontal and vertical lines of this procedure may be interchanged as desired.

For the purpose of directly indicating squares and taking square roots a diagonal line 17 is provided. To obtain a square of a number, one merely determines the intersection with diagonal line 17 of the vertical or horizontal line representative of the number. The curve 13 passing through that intersection is the desired square. For square root, the reverse operation is performed. The intersection of diagonal line 17 with the curve 13 representing the number to be square rooted is first determined. Then the horizontal or vertical line passing through that point represents the square root.

For the purpose of directly reading the areas of circles, a further diagonal line 18 is provided. If the slope of diagonal line 17 is considered to be unity, then the slope of line 18 is chosen to have the value $$\frac{4}{\pi}$$

Then, to measure an area of a circular outline on a scale plan, the left edge of the device 10 is placed along the diameter of the circular outline with the zero corner on one point of the circular outline. Where the circle intersects the left edge, the length of the diameter may be read off directly. By tracing to the right along a horizontal line 11 to the diagonal line 18, a diagonal line point is thereby determined. The curve 13 passing through that diagonal line point is then the area of the circle. Here again interpolation is used where the values fall between the lines or curves.

In addition to measuring rectangular or circular areas, the present device is readily adapted to measuring rectangular or cylindrical volumes where the 3rd dimension is known or can be determined. This is many times the case on standard plans where, for example, with respect to excavating, the depth is known or can be scaled and the cubic measurement of rock to be blasted is required. To do this most simply, the number on the curve 13, which may have been derived by determining the area of a rectangular or circular outline, is used as a multiplier. However, it is not necessary to transfer this number to the left or top edge of scales, since it can be used directly as multiplier in the following manner.

By way of example, let it be assumed that the area determined in the manner already described is 350 and the depth of excavation is 4 feet. Starting from the number "4" at the top edge of the scale, the corresponding vertical grid line 12 is followed to its intersection with the curve labelled "100." As would be expected, this is approximately at the horizontal grid line of value 25. This horizontal grid line is then followed to its point of intersection with the "350" curve. The vertical coordinate to that last intersection is at 14 as indicated on the top edge scale, giving the answer as 1400.

This method of multiplication of a product by a further multiplier can be readily utilized where correction is made for a plan scale different from that of the device 10. For example, as indicated above, if a plan has a scale of 1/32 inch per foot, the area determined by using the 1/16 scale of the present device should be multiplied by 4. This multiplication can be performed as just indicated. Although the "100" curve 13 was utilized in the preceding example, either the "10," "100" or "1,000" curve 13 could be utilized as convenient, with proper allowance for the decimal point.

After the volume of the space or material has been obtained, it may be necessary to apply a further factor to this result. The present device is readily adapted to do this. This situation occurs many times on standard plans where, for example, with respect to the ventilation of a room, the volume of the room has been determined and it is required to know the number of cubic feet of air per minute necessary to deliver to this room in order to accomplish one complete air change in one hour. This is done by merely dividing the number of cubic feet in the room by 60, the number of minutes in one hour. If the volume of the room was arrived at on a curve 13, this division is accomplished as described above. If, however, the final volume was arrived at as a number on an edge scale, this number can be used directly as a dividend, without transferring it to a curve, in the following manner:

By way of example, let it be assumed that the volume of a room has been determined as 2200 cubic feet, arrived at on the upper edge scale, and the number of cubic feet of air per minute required for a one-hour air change in this room is desired. Starting from number 6 at top edge of scale the corresponding grid line 12 is followed to its intersection with curve labelled 100. This is approximately at horizontal grid line 16.5. This horizontal grid line is then followed to its point of intersection with vertical grid line 22. The curve cutting this last intersection is at 370, giving the answer as 37.

While the above device has been described as formed by a transparent sheet, it will be apparent that it can also be applied to an opaque sheet of material, in which case, of course, the lower right hand corner of the plan rectangle being measured will not be visible through the sheet. However, the upper right hand corner and lower left hand corner will be visible and by sighting from these corners parallel to the upper and left edges of the device, a point on the device is determined which will be directly over the lower right hand rectangle corner, and the curve value at this point will, of course, be the area desired.

In brief, my device in use for measuring areas replaces the usual steps of making two measurements with a scale and three slide rule adjustments and likewise makes unnecessary the picking up and laying down of the scale and the slide rule. Thus the use of my device decreases the time spent in computing areas by a very large amount. Additionally, the time-saving aspect of my device extends to the calculation of cubical and cylindrical volumes, since these results can be readily arrived at by a quick visual reference from the number indicating area to the known third dimension. Again, as a general calculator, my device has advantages in speed of use over usual calculating methods because it is not slowed down by the mechanical adjustments which are necessary with the slide rule, even in the simplest problem of multiplication or division. Likewise, my device solves quickly many calculations which can be done on the average slide rule only by trial-and-error. This is accomplished by the fact that my device, being graphic in design, visually "telegraphs" ahead an approaching error, an advantage not possessed by the slide rule, since on that instrument it is necessary to go through every step of the calculation before the extent of the error is determined.

While the present device has been described as a single sheet of material with no moving parts and is most conveniently used in that manner, under some circumstances it may be desirable to provide a cursor movable in two directions over the curves of the figures so as to be able to retain a reading. For this purpose a pair of crosshair carrying elements may be provided in conventional manner respectively adapted to move parallel to the top and side edges of the device, their intersection providing effectively a cursor. Alternatively, a member may be provided movable parallel to one edge of the device and carrying a transversely movable element. As a simple way of providing a reading-retaining feature without such complexity, where the device 10 is transparent, it may be placed upon a sheet of white paper with a dot or cross mark thereon. By laying the device 10 over the dot or cross mark with the specific curve passing through the dot or intersection of the cross mark, the reading may be retained for future reference.

While the device 10 has been described as having the scale numbers extending along the top and left edges, which is a most useful arrangement where the device is to read areas and volumes directly as described above, where the device is to be used for general calculation in the manner indicated above, it is not necessary for the scales to be aligned with the edges of the sheet material nor to be located at those edges, but the plot shown in the figure may be placed anywhere upon the sheet forming the device. In such case, of course, the sheet need not be transparent.

It will, therefore, be apparent that the above description is merely illustrative of the nature of the present invention, the scope thereof being defined solely by the appended claims.

What is claimed is:

1. A calculating device for directly determining the areas of rectangular and circular geometric figures drawn to scale, comprising a planar sheet of material having a pair of perpendicularly arranged series of coordinate numbers arranged in arithmetic progression and determining a rectangular coordinate field, a family of curves on said field each representing the locus of points of equal coordinate product, and each bearing the numerical designation of its respective product, and a straight line on said field extending from the origin of said coordinates and of a slope substantially equal to $$\frac{4}{\pi}$$

2. A device for measuring the areas of planar figures comprising a rectangular sheet of material having scales of indicia marked along two intersecting edges thereof thereby defining a field of rectangular cartesian coordinates, a family of curves on said field, each curve being the locus of points of equal product of coordinates, and a straight line on said field intersecting all said curves and passing through the intersection of said two edges, said line having a slope substantially equal to $$\frac{4}{\pi}$$

3. A calculating device for determining the area of geometric figures drawn to scale, comprising a planar sheet of transparent material having two intersecting straight sides, a rectangular cartesian coordinate field on said sheet having an origin near one corner thereof, the coordinate axes of said field being respectively parallel and adjacent to said two straight sides, linear scale indicia along said coordinate axes giving the coordinate values of said field, a family of curves on said sheet passing through points of equal product of coordinate values in said coordinate field, and a sloping straight line drawn through the origin of said coordinate field, said line passing through all points whose coordinate values have the ratio $$\frac{\pi}{4}$$

4. A device for measuring the area of planar figures, comprising a sheet of transparent material rectangular in form, linear scales of equally spaced numeral indicia marked along two sides thereof, thereby defining a field of rectangular cartesian coordinates employing one corner of said rectangular sheet as an origin, a family of curves tracing the loci of points of equal area as determined by the coordinates in the field, and a pair of sloping straight lines passing through said origin, one of said lines passing through all points of equal coordinate values and the other of said straight lines passing through all points of coordinate values with a ratio equal to $$\frac{\pi}{4}$$

References Cited in the file of this patent

UNITED STATES PATENTS

| | | |
|---|---|---|
| 472,266 | Kindl et al. | Apr. 5, 1892 |
| 972,528 | Halloran | Oct. 11, 1910 |
| 2,189,857 | Crapez | Feb. 13, 1940 |
| 2,219,429 | Osterberg | Oct. 29, 1940 |

FOREIGN PATENTS

| | | |
|---|---|---|
| 85,205 | Austria | Aug. 25, 1921 |
| 248,620 | Great Britain | Mar. 11, 1926 |

OTHER REFERENCES

Page 71 of "Graphs and Charts," by Karl G. Karsten, published in 1923, by Prentice-Hall, Inc., New York.

Page 30, of "Graphical and Mechanical Computation," by Joseph Lipka, published in 1918 by John Wiley & Sons, Inc., New York.